Sept. 1, 1936.  P. WILSING  2,052,815
CONTROL GEARING
Filed Nov. 13, 1933  2 Sheets-Sheet 2

Inventor
P. Wilsing.
by
W. E. Evans
Attorney.

Patented Sept. 1, 1936

2,052,815

UNITED STATES PATENT OFFICE 2,052,815

CONTROL GEARING

Paul Wilsing, Duisburg, Germany, assignor to Demag Aktiengesellschaft, Duisburg, Germany Application November 13, 1933, Serial No. 697,719
In Germany November 17, 1932

11 Claims. (Cl. 74—278)

The invention relates to variable speed gearing in which a motor rotating at a uniform speed drives a driven member through mechanical control gearing with a variable speed of rotation and without a free position. By a free position is meant that position of transition in changing speed or direction of rotation in which the driven member is disconnected from the driving member so that it is then liable to move of itself, for example, under gravity when the vehicle is travelling uphill or downhill or under the influence of other forces.

The control gearing according to the invention consists of the engagement of a number of axially movable pairs of clutches with corresponding transmission gear wheels, in which by producing frictional engagement with one pair of clutches the frictional engagement of the adjacent pair of clutches is broken by axial movement. The invention furthermore relates to the construction of the controlling means for such control gearing as is hereinafter more fully described and as illustrated in the drawings.

Two constructions of the apparatus according to the invention are illustrated by way of example in the accompanying drawings.

Figure 1:
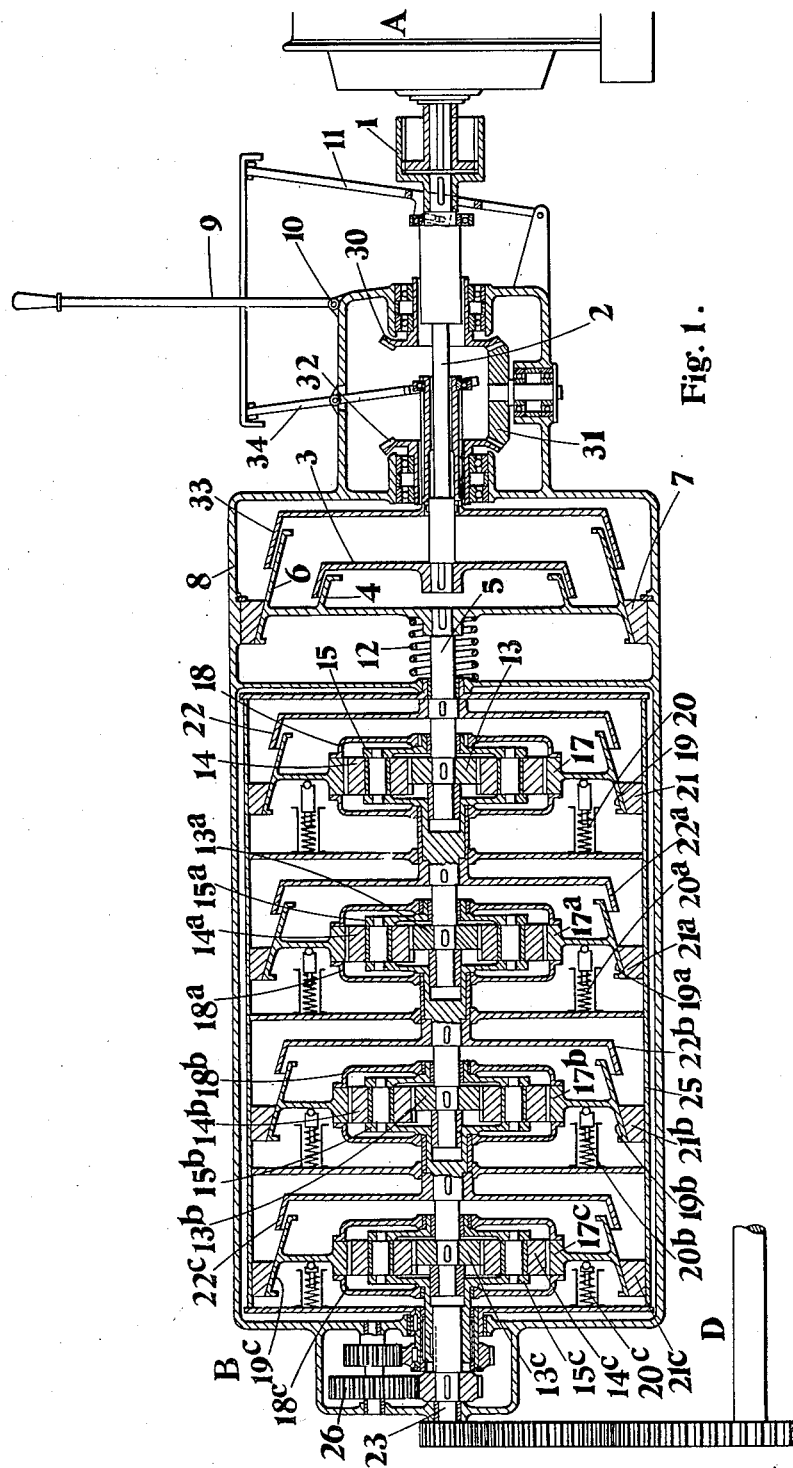
Figure 1 illustrates a winch provided with gearing shown in longitudinal section.

According to Figure 1 the motor A drives the shaft D—for example, the shaft of travelling mechanism, the shaft of a hoisting mechanism, or the like—through variable speed gearing B and gear transmission C. The motor A is connected through the coupling 1 to the shaft 2 of the gearing B, on which shaft is mounted a cone disc 3. The cone disc 3 acts in co-operation with a co-operating disc 4 secured on the shaft 5. The disc 4 is provided with a further cone 6, adapted to co-operate with the stationary brake ring 7, which is secured in the casing 8 of the gearing B. If the shaft 2 is moved to the left through the lever 11 by a movement to the left of the hand lever 9 (which is rotatable on the pin 10), the discs 3 and 4 are brought into operative engagement with each other and at the same time move the disc 6 away from the brake ring 7, the spring 12 being at the same time compressed. The motor A is thus brought into connection with the gear shaft 5. It is to be noted that the lever 9 is provided with forwardly and rearwardly extending hook portions by which it is caused to move each of the levers 11 and 34 in one direction only.

The shaft 5 has slidably splined upon it the sun pinion 13 of planet gearing 18, whose planet wheels 14 are connected through the planet spindles 15 to a sun pinion 13a of further planet gearing. The internally toothed annulus 17 of the planet gearing 18 is mounted in a casing forming part of a co-operating cone disc 19, which is pressed against the brake ring 21 by the springs 20. When the motor is driving the shaft 5 the sun pinion 13 is also rotating and thus the planet wheels 14 revolve on the annulus 17. The planet carrier of the wheels 14 in turn drive the sun pinion 13a, which drives the planet wheels 14a of the planet gearing 18a. The carrier of the planet wheels 14a is connected to the sun pinion 13b, which drives the pinion 13c through the carrier of the planet wheels 14b as in the manner hereinbefore described. This series may be continued as desired. The carrier of the last planet wheels 14c is connected to the transmission gear wheels C through the driven shaft 23 and drives the shaft D.

The disposition of the gearing hereinbefore described conforms to the lowest speed of the driven shaft. The speed of rotation of the motor shaft and of the gear shaft 5 is considerably reduced by the planet gearing. Increased speed of the driven shaft is produced by locking solid the planet gearings one after the other. Each of the sun pinion shafts is connected to one of the clutch discs 22, 22a, 22b and 22c, which co-operate with the corresponding discs 19, 19a, 19b and 19c. If the lever 9 be swung over still further in the same direction as at first, the discs 22 and 19 come into frictional contact and the disc 19 is moved away from the brake ring 21 by overcoming the resistance of the spring 20. As the two members 19 and 22 rotate at the same speed, the planet gearing acts in manner similar to a toothed coupling and therefore rotates as a unit without relative movement of the parts.

In similar manner the planet gearing 18a, 18b and 18c can be locked solid, by throwing the lever 9 further into engagement, each movement producing an increase in speed. The maximum speed is reached when the shaft 23 has attained the speed of the motor and the shaft 5.

The brake rings 21, 21a, 21b and 21c are mounted on a drum 25, which is rotated by the shaft 23 through gearing 26. The rings 21, 21a, 21b and 21c therefore rotate at a speed which is proportional to the speed of rotation of the driven shaft 23.

The springs 20, 20a, 20b and 20c can be so set that they allow only a limited torque to be transmitted and the clutches act as slip or overload friction couplings.

In order to enable the different speeds to be attained with the driven shaft D rotating in either direction, a reversing gearing is provided; this gearing is formed of the bevel wheels 30, 31 and 32. The bevel wheel 30 is splined to the shaft 2, and the bevel wheel 32 is splined to a clutch disc 33, which co-operates with the clutch disc 6. If the lever 9 be moved over to the right, that is to say in the opposite direction to the controlling direction as hereinbefore indicated, it moves the disc 33 through the lever 34, and the disc 33 is brought into frictional engagement with the disc 6, the latter being pressed to the left by overcoming the resistance of the spring 12, which action causes the disc 6 to be moved away from the brake ring 7. The connections which are effected upon the further movement of the lever 9 in the same direction again produce a coupling of the discs 19, 22 to 19c, 22c by successively locking the planet gearings, exactly in the manner hereinbefore described except that rotation is in the opposite direction because of the manner in which the reversing gearing is connected up. Thus, it is possible to change from the zero position to the maximum speed in either direction of rotation by the simple movement of the lever 9. When changing the direction of rotation it is not necessary to stop the motor and accelerate it in the opposite direction, but on the other hand the change over can be smoothly effected, which saves considerable time and the work involved in accelerating.

It will be understood that the normal disposition of the clutch discs 22, 22a, 22b, 22c and the co-operating discs 19, 19a, 19b, 19c is such as to permit the engagement of the co-operating pairs of discs in succession. For example, the disc 22 is normally closer to the disc 19 than is the disc 22a to the disc 19a.

Figure 2:
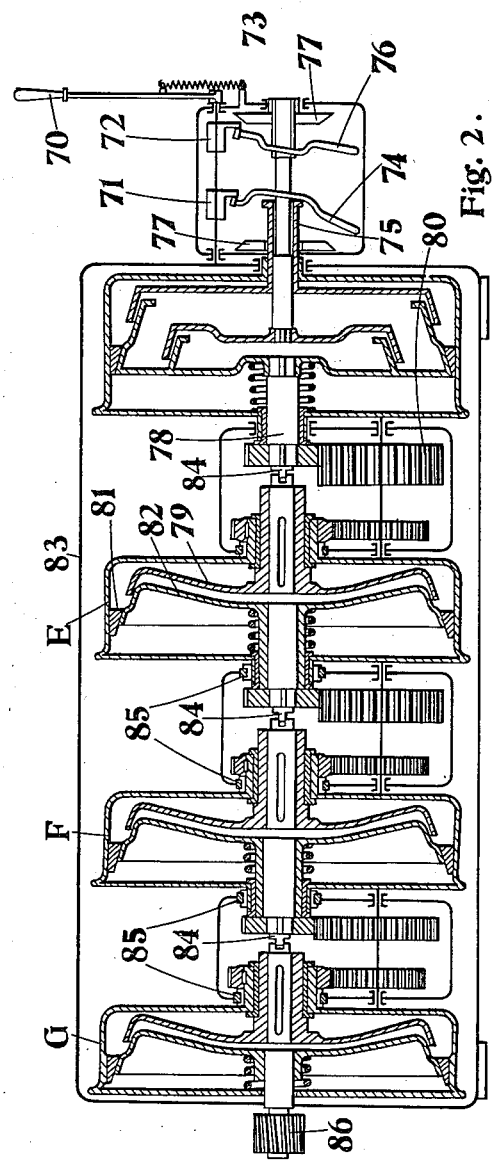
Figure 2 illustrates partly in cross-section gearing with clutch elements.

Figure 2 illustrates a construction in which the planet gearing for driving the clutch discs between the stages are replaced by variable speed gears with stationary spindles, each of which gears is driven from the adjacent speed stage. By this means the assembling of the gearing is facilitated.

The hand lever 70 partially rotates the two cams 71 and 72, each of which is shaped to impart movement in a direction parallel with the axis of the spindle upon which it is mounted and, one of which moves the shaft 73 by means of the lever 76 and the other the bush 75 by means of the lever 74. By this means the two reversing gear wheels 77 of the change gear are engaged with the gear shaft 78 in the manner shown in Figure 1. The shaft 78 which is splined to the first wheel of the gear 80, drives the disc 79 directly and also drives the clutch disc 81 through the gear wheel transmission 80, the disc 81 being driven at a slower speed than the disc 79. The corresponding clutch disc 82 at first rotates at the same speed as the disc 81. If the shaft 78 be now moved to the left the discs 79 and 82 are engaged and the disc 82 and 81 disengaged, and thereafter the disc 82 is given the same speed of rotation as the disc 79. The disc 81 continues to be driven by the gearing 80, but rotates freely since the clutch disc 82 has been moved axially out of contact with it by the clutch disc 79. Continued axial movement of the shaft 78 operates the clutches of the following units in succession. Upon the change back to the slower speed the movements of the connection are reversed.

In the gearing illustrated three clutch units E, F and G are shown, so that the gearing is capable of four speeds, that is to say, the direct drive and a speed for each of the units E, F and G. The clutch units may be all of one size, so that they are interchangeable. Three clutch discs, such as 79, 81 and 82 with the corresponding variable speed gear form a unit, which can then be withdrawn from the gear casing 83 as a whole. For this purpose releasable toothed couplings, 84 are provided between the shaft 78 and the clutch disc of each unit, so that the units can always be withdrawn in succession by movement transverse to the axis, the teeth of the respective couplings being normal to the axis of rotation of the units. The whole gearing may consist in this way of a number of units to be of a size depending upon the use to which the gearing is to be put. It is advantageous to mount each unit separately in bearings 85, as shown in the drawings.

In certain cases care must be taken that the last unit is not brought into direct drive when there is a full load. According to a modification of the invention this is ensured against by a rearward axial thrust of the driven member being transmitted to the hand lever 70. This is effected by providing the last pinion 86 of the gearing with helical teeth. In this way a rearward pressure is exerted on the last unit, which may be of such dimensions that the movement of the lever 70 for the connection of the last unit becomes impossible so long as the whole load is effective. Only when the load is light is the power of the hand sufficiently great to overcome the backward actions of the driven member. This is very important, for example, in a vehicle when travelling uphill.

The axial thrust of the clutch coupling springs may be relieved or compensated at the operating hand lever by means of a suitably disposed spring, acting on the hand lever in the opposite direction to the thrust of the clutch springs, as illustrated in Figure 2.

I claim:

1. Variable speed gearing comprising a plurality of groups of frictional coupling elements, each group consisting of a coupling element of fixed axial position, a driven axially movable coupling element normally in engagement with the coupling element of fixed axial position and a second axially movable coupling element to engage with the first axially movable coupling element and simultaneously to disengage the latter from the coupling element of fixed axial position without the occurrence of a free disposition of any of the elements, gear trains disposed between the said groups of coupling elements and modifying and transmitting to the succeeding group of coupling elements the movement of rotation received from the preceding group of coupling elements, a prime mover and means for imparting movement from the said prime mover to the first group of coupling elements, the second axially movable element and the element of fixed axial position of each group of coupling elements being rotated at different speeds.

2. Variable speed gearing comprising a plurality of groups of frictional coupling elements, each group consisting of an element of fixed axial position, a driven axially movable element normally in engagement with the element of fixed axial position and a second axially movable element to engage with the first axially movable element and simultaneously to disengage the latter from the element of fixed axial position, gear trains disposed between the said groups of coupling elements and modifying and transmitting to the succeeding group of coupling elements the movement of rotation received from the preceding group of coupling elements, a prime mover, means for imparting movement from the said prime mover to the first group of coupling elements, the second axially movable element and the element of fixed axial position of each group of coupling elements being rotated at different speeds, and an axially movable control shaft successively engaging the axially movable elements of the respective groups of coupling elements with the corresponding first axially movable element.

3. Variable speed gearing comprising a plurality of groups of frictional coupling elements, each group consisting of an element of fixed axial position, a driven axially movable element normally in engagement with the element of fixed axial position and a second axially movable element to engage with the first axially movable element and simultaneously to disengage the latter from the element of fixed axial position, gear trains disposed between the said groups of coupling elements and modifying and transmitting to the succeeding group of coupling elements the movement of rotation received from the preceding group of coupling elements, a prime mover, means for imparting movement from the said prime mover to the first group of coupling elements, the second axially movable element and the element of fixed axial position of each group of coupling elements being rotated at different speeds, a reversing gear comprising a group of frictional coupling elements consisting of an element of fixed axial position, an axially movable element for engaging the element of fixed position and two driving axially movable elements each adapted to engage the first axially movable element and to disengage it from the element of fixed axial position, and means for driving the said elements in reverse directions of rotation.

4. Variable speed gearing comprising a plurality of groups of frictional coupling elements, each group consisting of an element of fixed axial position, a driven axially movable element normally in engagement with the element of fixed axial position and a second axially movable element to engage with the first axially movable element and simultaneously to disengage the latter from the element of fixed axial position, gear trains disposed between the said groups of coupling elements and modifying and transmitting to the succeeding group of coupling elements the movement of rotation received from the preceding group of coupling elements, a prime mover, means for imparting movement from the said prime mover to the first group of coupling elements, the second axially movable element and the element of fixed axial position of each group of coupling elements being rotated at different speeds, a reversing gear comprising a group of frictional coupling elements consisting of an element of fixed axial position, an axially movable element for engaging the element of fixed position and two driving axially movable elements each adapted to engage the first axially movable element and to disengage it from the element of fixed axial position, means for driving the said elements in reverse directions of rotation and an axially movable control shaft successively engaging the axially movable elements of the respective groups of coupling elements with the corresponding first axially movable element.

5. Variable speed gearing comprising a plurality of groups of frictional coupling elements, each group consisting of an element of fixed axial position, a driven axially movable element normally in engagement with the element of fixed axial position and a second axially movable element to engage with the first axially movable element and simultaneously to disengage the latter from the element of fixed axial position, gear trains disposed between the said groups of coupling elements and modifying and transmitting to the succeeding group of coupling elements the movement of rotation received from the preceding group of coupling elements, a prime mover, means for imparting movement from the said prime mover to the first group of coupling elements, the second axially movable element and the element of fixed axial position of each group of coupling elements being rotated at different speeds, a reversing gear comprising a group of frictional coupling elements consisting of an element of fixed axial position, an axially movable element for engaging the element of fixed position and two driving axially movable elements each adapted to engage the first axially movable element and to disengage it from the element of fixed axial position, means for driving the said elements in reverse directions of rotation, and a single oscillatable hand lever for operatively engaging the second axially movable element with the first axially movable element of the respective groups of coupling elements successively and also for controlling the reversing gear.

6. Variable speed gearing comprising a plurality of groups of frictional coupling elements, each group consisting of an element of fixed axial position, a driven axially movable element normally in engagement with the element of fixed axial position and a second axially movable element to engage with the first axially movable element and simultaneously to disengage the latter from the element of fixed axial position, gear trains disposed between the said groups of coupling elements and modifying and transmitting to the succeeding group of coupling elements the movement of rotation received from the preceding group of coupling elements, a prime mover, means for imparting movement from the said prime mover to the first group of coupling elements, the second axially movable element and the element of fixed axial position of each group of coupling elements being rotated at different speeds, and a control lever mounted for movement in opposite directions and in one direction of movement from the zero position operatively engaging the second axially movable element of each group of coupling elements with the first axially movable element and in the reverse direction of movement withdrawing the said axially movable elements from engagement successively.

7. Variable speed gearing comprising a plurality of groups of frictional coupling elements, each group consisting of an element of fixed axial position, a driven axially movable element normally in engagement with the element of fixed axial position and a second axially movable element to engage with the first axially movable element and simultaneously to disengage the latter from the element of fixed axial position, gear trains disposed between the said groups of coupling elements and modifying and transmitting to the succeeding group of coupling elements the movement of rotation received from the preceding group of coupling elements, a prime mover, means for imparting movement from the said prime mover to the first group of coupling elements, the second axially movable element and the element of fixed axial position of each group of coupling elements being rotated at different speeds, and the second axially movable element of the succeeding groups of coupling elements being normally disposed at a distance from the corresponding first axially movable element greater than that in the preceding group of coupling elements.

8. Variable speed gearing comprising a plurality of groups of frictional coupling elements, each group consisting of an element of fixed axial position, a driven axially movable element normally in engagement with the element of fixed axial position and a second axially movable element to engage with the first axially movable element and simultaneously to disengage the latter from the element of fixed axial position, gear trains disposed between the said groups of coupling elements, the second axially movable element being related to the first member of the preceding gear train and the corresponding element of fixed axial position being related to the last member of the preceding gear train, a prime mover and means for imparting movement from the said prime mover to the first group of coupling elements.

9. Variable speed gearing comprising a plurality of groups of frictional coupling elements, each group consisting of an element of fixed axial position, a driven axially movable element normally in engagement with the element of fixed axial position and a second axially movable element to engage with the first axially movable element and simultaneously to disengage the latter from the element of fixed axial position, the element of fixed axial position being formed as a casing for the remaining elements of the group of coupling elements, co-axial and relatively movable shafts mounted in the said casing and respectively supporting the axially movable elements of the group of coupling elements, the said shafts being adapted to be coupled respectively with the corresponding shafts of the succeeding and preceding groups of coupling elements and gear trains disposed between the said groups of coupling elements, the first member of each gear train being on the shaft of the first axially movable element of the preceding group of coupling elements and the last member of the gear train being upon the shaft of the second axially movable element of the succeeding group of coupling elements.

10. Variable speed gear comprising groups of coupling elements each consisting of an axially immovable element, an axially movable element normally in engagement with the first element and a third axially movable element, which when brought into engagement with the second element separates the first and second elements, and means such as springs for forcing the second element into engagement with the first, and means for transmitting movement of the second element of one group of coupling elements to the first element of the succeeding group of coupling elements with a determined transmission ratio.

11. Variable speed gearing comprising groups of coupling elements, each group consisting of coupling elements formed of two frictional connections, one being effected between a non-axially movable element and an axially movable element, and a second being formed between the said axially movable element and a third axially movable element and the elements being so disposed that the separation of the first axially movable element from the non-axially movable element is effected simultaneously with the engagement of the two axially movable elements, and means for transmitting a drive from one group of coupling elements to a succeeding group of coupling elements for imparting to the elements of the latter group which are alternately engaged different speeds of rotation corresponding to the change of speed to be transmitted by the gearing.

PAUL WILSING.